Patented Oct. 8, 1929

1,730,738

UNITED STATES PATENT OFFICE

CHARLES L. LEVERMORE, OF ROCKVILLE CENTER, LONG ISLAND, NEW YORK, ASSIGNOR TO GENERAL CHEMICAL COMPANY, OF NEW YORK, N. Y., A CORPORATION OF NEW YORK

ROASTING FINES ORE

No Drawing.   Application filed February 23, 1928. Serial No. 256,488.

My invention relates to the roasting of finely divided sulphide ore, and more particularly to the roasting of sulphide ore fines and flotation concentrates to thoroughly desulphurize the same and to produce sulphur dioxide for use in the manufacture of sulphuric acid.

It has been suggested to roast ore fines and flotation concentrates by forming a gaseous suspension of the finely divided material in air, and/or combustion products of carbonaceous fuel, etc., and passing the suspended material through a shaft or similar furnace wherein it is roasted while in transit.

When the suspension method of roasting is applied to oxidizing sulphide fines and sulphide flotation concentrates, and particularly when used as a source of sulphur dioxide for sulphuric acid manufacture, the desulphurization obtainable is not as thorough as is desirable for efficient utilization of the sulphide material. Appreciable amounts of undesulphurized material are found in the cinder, and resort to the ordinary corrective expedients such as increasing the proportion of oxidizing gas and the like, does not effect the elimination of the source of difficulty.

I have investigated this problem and I have found that the moisture content of the fines used, even when very slight, has a very marked influence upon the efficiency of the desulphurizing operation. This is particularly true as regards fines of a particle size smaller than 60 mesh, and it is with material of such fineness that the present disclosure is concerned.

The action of the moisture is probably mainly physical, although it is possible that it also involves chemical phases, and one of its undesirable aspects is that it encourages the formation of pellets or small agglomerations of the finely divided material, which masses are only slightly desulphurized in their passage through the roasting chamber.

After careful investigation of this moisture phase, I have found that what may be considered as a critical moisture content exists at .3%. When fines are used whose moisture content exceeds .3% the objectionable, incomplete desulphurization is experienced, but when the moisture in the fines is maintained below this limit, the difficulty appears to be substantially eliminated. For example, between .1% and .2%, the preferred operating range of my invention, the desulphurizing action leaves little to be desired from a practical standpoint in so far as the detrimental effect of moisture upon the reaction is concerned. It might be expected that the high moisture content (up to 10%) frequently present in finely divided ores in storage or in transit, would deleteriously affect the suspension roasting operation, but it would ordinarily not be considered that slight moisture contents, approaching the critical point above mentioned, would be harmful; as it would seem that such slight amounts of moisture would be completely eliminated at the high temperature of the roasting operation and hence permit the attainment of thorough desulfurization. My investigation, however, has shown the contrary to be true, and that the moisture content must be rigidly limited to proportions below the critical point noted, in which case a surprising increase in the desulfurization is obtained.

In most instances, a drying step will be necessary to obtain the moisture content noted herein, and particularly when flotation concentrates serve as a source of material. It is conceivable, however, that the moisture content of some of the fines available could be below the .3% limit noted, and consequently no drying step would be necessary. The drying may be accomplished by heating the fines in any well known manner, preferably accompanied by a mixing or agitating operation to inhibit agglomeration of the particles.

When the suspension method of roasting is applied to the oxidation of sulphide fines and flotation concentrates having the characteristics involved in my invention; viz, a moisture content of less than .3%, a particle size less than 60 mesh and particularly to iron pyrites fines, the resulting operation in the roasting chamber is very satisfactory. No appreciable amounts of undesulphurized material are found in the cinder, and the efficiency of the operation is materially increased.

I claim as my invention:

1. In the desulphurization of ores, the steps which comprise providing finely divided sulphide ore, having a moisture content of less than .3%, and roasting said ore while in gaseous suspension.

2. In the desulphurization of ores, the steps which comprise providing finely divided sulphide ore having a moisture content between .1% and .2%, and roasting said ore while in gaseous suspension.

3. In the desulphurization of ores, the steps which comprise providing finely divided sulphide ore having a moisture content of less than .3% and of a fineness of less than 60 mesh, and roasting said ore while in gaseous suspension.

4. In the desulphurization of ores, the steps which comprise providing finely divided sulphide ore having a moisture content between .1% and .2% and of a fineness of less than 60 mesh, and roasting said ore while in gaseous suspension.

5. In the desulphurization of ores, the step of roasting in gaseous suspension a finely divided sulphide ore having a moisture content of less than .3%.

6. In the desulphurization of ores, the step of roasting in gaseous suspension a finely divided sulphide ore having a moisture content of less than .3% and a fineness of less than 60 mesh.

7. In the desulphurization of ores, the step of roasting in a gaseous suspension a finely divided sulphide flotation concentrate having a moisture content of less than .3%.

8. In the desulphurization of a finely divided sulphide ore by roasting the ore while in gaseous suspension, the preliminary step which comprises drying the finely divided sulphide ore to reduce the moisture content to less than .3%.

9. In the desulphurization of a finely divided sulphide ore by roasting the ore while in gaseous suspension, the preliminary step which comprises drying the finely divided sulphide ore to reduce the moisture content to between .1% and .2%.

10. In the desulphurization of sulphide flotation concentrates by roasting while in gaseous suspension, the preliminary step which comprises drying said concentrates to reduce the moisture content to less than .3%.

11. In the desulphurization of sulphide flotation concentrates by roasting while in gaseous suspension, the preliminary step which comprises drying said concentrates to reduce the moisture content to between .1% and .2%.

CHARLES L. LEVERMORE.